United States Patent [19]

Smith et al.

[11] Patent Number: 5,327,854
[45] Date of Patent: Jul. 12, 1994

[54] ELECTRIC FISH SHOCKING DEVICES USING PROGRAMMABLE OUTPUT WAVEFORMS

[75] Inventors: David V. Smith; Lee R. Carstensen; Mark D. Salzman, all of Vancouver, Wash.

[73] Assignee: Smith-Root, Inc., Vancouver, Wash.

[21] Appl. No.: 924,332

[22] Filed: Jul. 31, 1992

[51] Int. Cl.$^5$ .............................................. A01K 79/02
[52] U.S. Cl. ...................................... 119/220; 340/573
[58] Field of Search ........................ 119/3, 29; 340/573

[56] References Cited

U.S. PATENT DOCUMENTS

| | | | |
|---|---|---|---|
| 2,836,735 | 5/1958 | Kreutzer | 307/110 |
| 3,043,041 | 7/1962 | Kreutzer | 43/17.1 |
| 3,693,276 | 9/1972 | Kurc | 43/6.5 |
| 4,038,560 | 7/1977 | Newman et al. | 307/106 |
| 4,211,980 | 7/1980 | Stowell | 119/3 |
| 4,417,301 | 11/1983 | Newman | 363/129 |
| 4,580,525 | 4/1986 | Marzluf | 119/3 |
| 4,593,648 | 6/1986 | Marzluf | 119/3 |
| 4,750,451 | 6/1988 | Smith | 119/3 |
| 4,825,810 | 5/1989 | Sharber | 119/3 |
| 5,111,379 | 5/1992 | Sharber et al. | 363/128 |

FOREIGN PATENT DOCUMENTS

| | | | |
|---|---|---|---|
| 248497 | 10/1989 | Japan | 119/3 |
| 200337 | 10/1967 | U.S.S.R. | 119/3 |
| 380382 | 10/1975 | U.S.S.R. | 119/3 |
| 727188 | 4/1980 | U.S.S.R. | . |
| 878223 | 11/1981 | U.S.S.R. | . |

OTHER PUBLICATIONS

Hofstede, "Electric Fishing Devices Used in the Netherlands in Still Waters," *Fishing With Electricity*, Published by Food and Agriculture Organization of the United Nations, 1967, pp. 103-124.
Chmielewski, "Three-phase Electric Fish Screen, Type M6 for Very Large Installations," *Fishing With Electricity*, Published by Food and Agriculture Organization of the United Nations, 1967, pp. 222-245.
"Electrofisher Workshop, Principles and Techniques of Electrofishing, Instructor David Smith, May, 1989, pp. 1-41, including articles by Wydoski," Effects of Electric Current on Fish and Invertebrates, undated, pp. 1-6; and Emery, The Physiological Effects of Electrofishing, Cal-Neva Wildlife Transactions 1984, pp. 1-14.
Smith-Root, Inc. GFFB/GFFG Fish Barrier & Guidance Systems, Jan. 1992, pp. 1-20, 3 pages of photographs.
Reynolds, "Electrofishing-induced Injuries to Fish: What We Know and Need to Know, Alaska Cooperative Fish & Wildlife Research Unit, Mar. 9, 1992, pp. 1-6, including article by Sharber et al., Reducing Electrofishing-Induced Injury in Rainbow Trout," undated, pp. 1-20.
Newman, "Spinal Injuries of Walleye Caused by Pulsed DC Electrofishing," Office of Fishery Assistance, Ashland, Wis., Jun., 1991, pp. 1-20.

*Primary Examiner*—John G. Weiss
*Attorney, Agent, or Firm*—Klarquist, Sparkman, Campbell, Leigh & Whinston

[57] ABSTRACT

An electrofishing method and apparatus employs programmable hardware to generate output waveforms that will stun or alter the behavior of fish while minimizing the harm done to the fish. By programming a variety of instructions into the programmable hardware, a wide range of different output waveforms can be produced. The programmable hardware can also monitor environmental conditions to automatically adjust and optimize the waveform parameters. Finally, the programmable hardware can be interconnected by a data network to form an array of charged electrodes, with each output related and synchronized in a predetermined way for use in electric fish barriers and guidance systems.

20 Claims, 6 Drawing Sheets

FIG. 7

ELECTRIC FISH SHOCKING DEVICES USING PROGRAMMABLE OUTPUT WAVEFORMS

TECHNICAL FIELD

The present invention relates to electric fish shocking devices, and more particularly relates to programmable hardware useful for controlling parameters of the electrical signals used to shock fish.

BACKGROUND AND SUMMARY OF THE INVENTION

Electric fish shocking devices find numerous applications in stunning and collecting fish. Electric fish shocking devices also have applications in electric fish barrier arrays and electric fish guidance systems. For a description of such a fish barrier, see U.S. Pat. No. 4,750,451 issued on Jun.14, 1988 to David V. Smith.

Fish shocking devices typically seek to minimize the harm done to fish while accomplishing their designed functions. For example, electrofishers induce the fish to swim toward the anode (galvanotaxis) and hold the fish in an immobile state (galvanonarcosis) so they can be collected without excessive harm or damage. In electric fish barriers, the fish must be prevented from crossing the barrier without being injured or killed in the process.

In order to maximize the effectiveness of the device, a careful balance must be maintained between applying the needed electrical power and minimizing fish damage. This is particularly true with threatened or endangered fish species. Factors that affect the amount of electrical power needed include: Voltage level, Constant versus Varying or Pulsed Current, Direct Current (DC) versus Alternating Current (AC), the conductivity of the water, the fish species, and fish size.

Prior art electric fish shocking devices generally limit the adjustment of waveform parameters and usually only provide a small number of simple waveforms. Typically, prior art electric fish shocking devices employ a series of rectangular pulses, and permit the user to manually adjust the voltage, width and frequency over narrow ranges.

In addition, prior art electric fishing devices usually have not provided flexibility for automatically adjusting these parameters as conditions change, and have been ill-equipped to generate a variety of other waveform types that might prove more effective or less harmful to the fish in given circumstances. Thus, there is a need for a new and improved electric fish shocking device which overcomes such difficulties.

In accordance with the present invention, this need is fulfilled by placing the waveform generating burden on programmable hardware. In a preferred embodiment, a microprocessor controls a high speed switch which is used to control the output of a high voltage power supply. Thus, the device has the ability to produce continuous output or variable length pulses. The programmable hardware allows the generation of more complex waveforms such as gated bursts (a number of short pulses followed by a longer quiet period) and pulses that vary their width and/or frequency over time (Pulse Width and/or Frequency Modulation).

If provision is made for programmable control of the power supply output voltage level, then the hardware can produce amplitude modulated waveforms. If environmental feedback sensors are used, such as water conductivity monitors or sonar fish locators, then the output waveform parameters can automatically adjust to optimize the desired effect while minimizing any harm done to the fish.

The foregoing and additional features and advantages of the present invention will be more readily apparent from the following detailed description, which proceeds with reference to the accompanying drawings.

DETAILED DESCRIPTION

Figure 1:
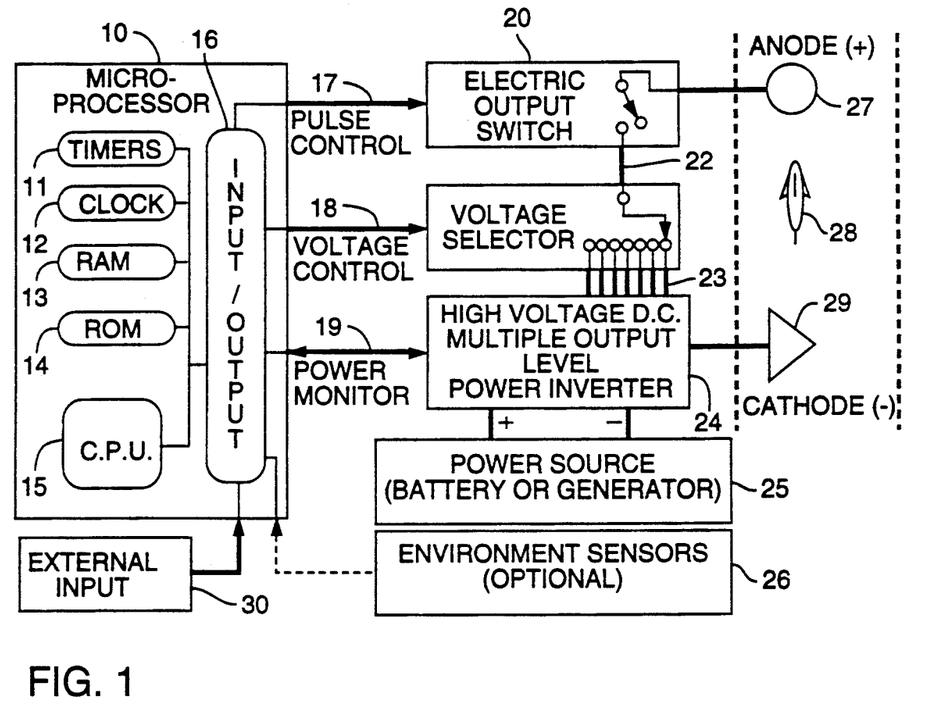
FIG. 1 is a block diagram showing the interconnection of hardware components in one embodiment of the present invention.

Referring to FIG. 1, an Electric Fish Shocking Device according to the present invention includes a power supply 25, a power inverter 24, a voltage selector 21, an electric output switch 20, and an anode 27 and cathode 29. The electric fish shocking device also employs a microprocessor 10 to control the generation of the output waveforms. The microprocessor controls the power inverter 24, the voltage selector 21, and the electric output switch 20 to generate high output waveforms with variable pulse widths, frequencies, and voltage amplitudes.

Characteristics of the output waveforms are determined by external input 16 and by software instructions programmed into the Microprocessor's memory 13 and 14. The optional environment sensors 26 can also provide waveform generation information.

Power supply 25 produces the basic voltage and current used to generate the output waveforms. In an illustrative embodiment, the power supply is a normal alternating current (AC) power source operating at 60 Hz and 120 volts. However, the power supply may be a local generator, a direct current (DC) battery, or any sufficient source of power.

The power supply 25 is connected to a power inverter 24. The power inverter 24 is used to generate a high power output. In the illustrated embodiment, the power inverter 24 converts the low voltage from the power source 25 to a multiple of higher voltage outputs 23. The power inverter 24 is typically a AC to DC or DC to DC type and is coupled to the power source 25. The power inverter 24 can deliver a variety of voltage levels and is capable of supplying enough current at each voltage level to electrify a sufficient volume of water. The power inverter 24 also provides electrical isolation from the power source 25, to help eliminate dangerous ground loops and to allow a number of electric fish shocking devices to be used together.

Figure 5A:
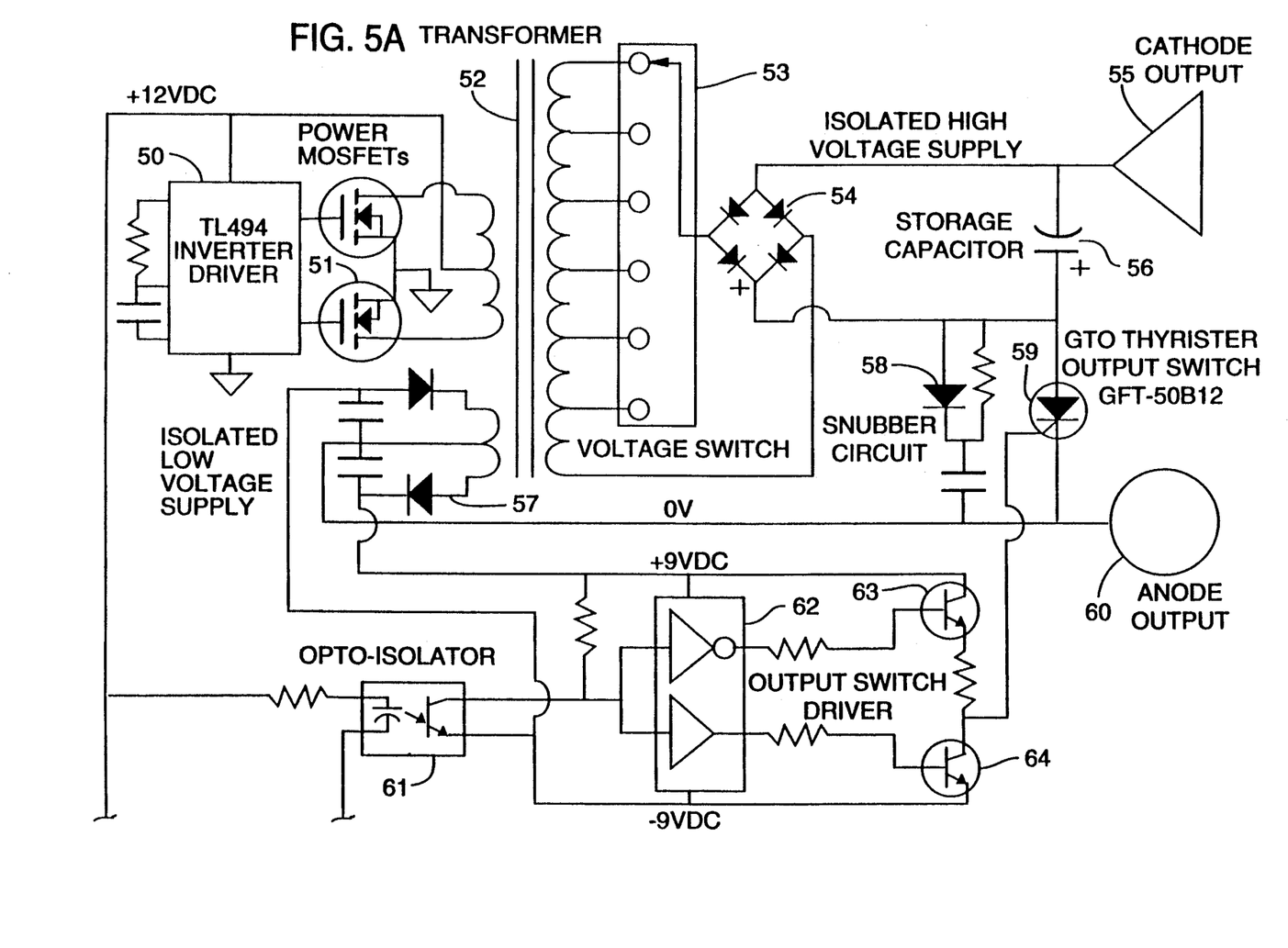
FIGS. 5A and 5B depicts a illustrative schematic diagram of one embodiment of the present invention.
Figure 5B:
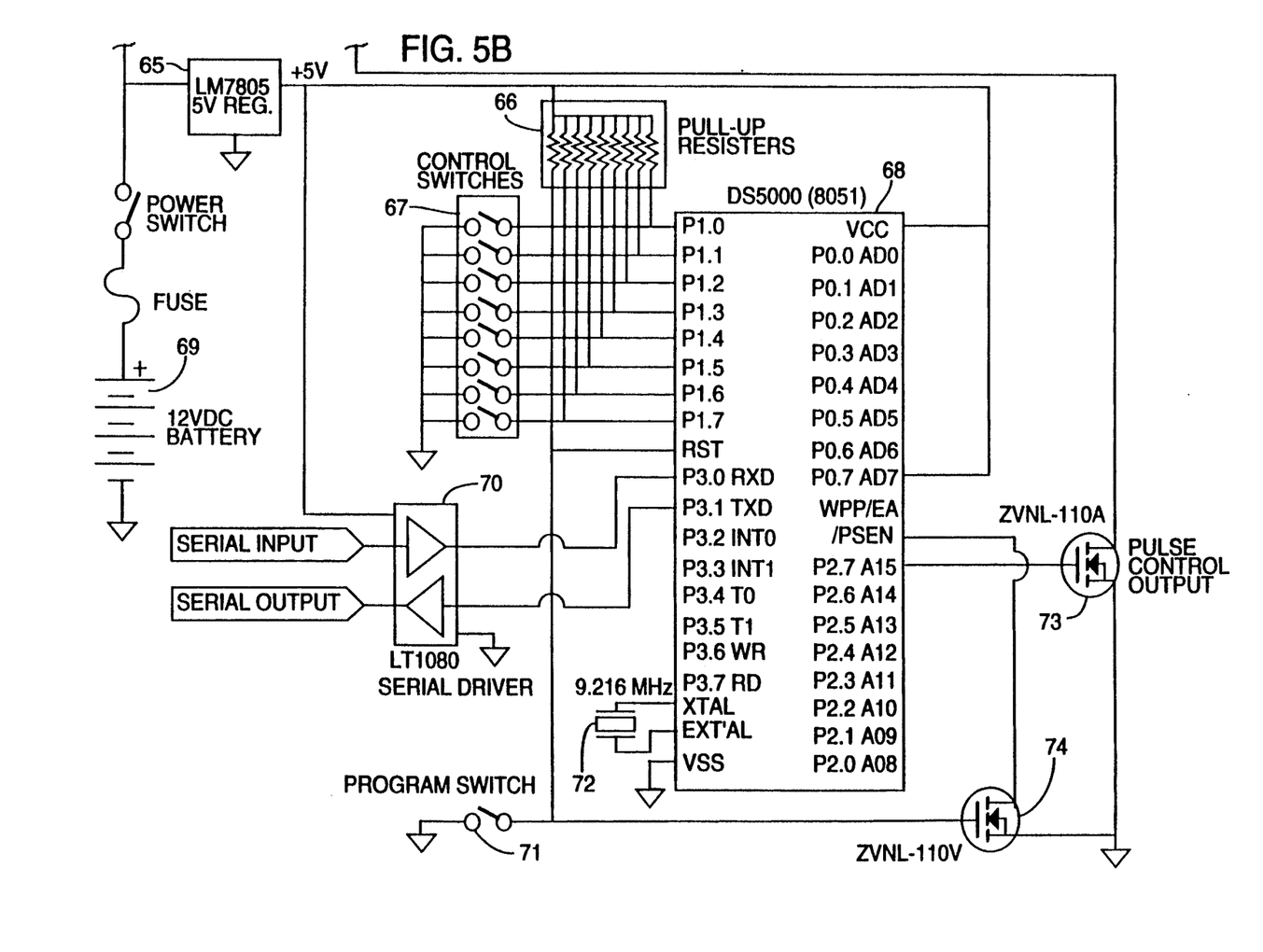

An illustrative embodiment of a power inverter is depicted in FIGS. 5A and 5B. In this embodiment, the power inverter includes a DC to DC Inverter, consisting of an oscillator/driver IC 50, a set of power MOSFETs 51, a high efficiency transformer 52, a high voltage rotary switch 53 and a diode bridge 54.

In operation, the low voltage current from the power source 69 (shown as a 12 volt direct current battery) is applied through power MOSFET switches 51 to alternate sides of the primary windings of the transformer 52. The MOSFETs 51 are switched at a fast rate by the driver IC 50 and thus produce an alternating current. The alternating current flows into the transformer 52.

A voltage selector chooses from a variety of high output voltages by selecting one the taps on the secondary windings of the transformer 52. Thus, the voltage selector provides a means of changing the high output voltage to accommodate a wide range of water conductivity. In this illustrative embodiment, the voltage selector consists of a manually operated rotary switch 53 connected to the taps of the transformer's secondary winding 52. However, in the preferred embodiment, a microprocessor can control the voltage selector with a set of relays or a relay with multiple contacts (such as model # RF57D-12S from ITT Corp.), or some other electronically controllable switching means.

The voltage selector can also include electronic switches or relays that operate as a digital-to-analog converter. Under microprocessor control, the switches and relays can produce amplitude modulated high voltage waveforms. In addition, a programmable switching bridge can alter the output polarity of the high voltage and produce alternating current waveforms.

After the voltage selector selects the desired output voltage, the current is then rectified to DC by the diode bridge 54 depicted in FIGS. 5A and 5B. The rectified high voltage current then charges the storage capacitor 56. The high voltage current stored on the storage capacitor 56 is then switched on and off by an electric output switch 20. The electric output switch modulates the high power output to create a high power output waveform. The electric output switch 20 of FIG. 1 is illustrated in FIGS. 5A and 5B by a Gate Turn Off Thyristor 59, such as model # GFT-5OB12 from Hitachi, and circuitry 61 through 64 to drive the device into its on and off states. Other switching methods and devices can be used as long as they meet the speed and power handling requirements, and are controllable by the microprocessor 68.

The gate turn off thyristor 59 is driven to its on and off states by an opto-isolator 61, a buffer IC with inverting and non-inverting outputs 62, and a set of driver transistors 63 and 64. This driver circuit is powered by an isolated supply from the DC to DC inverter 57 which produces positive and negative low voltages. The driver circuit uses the positive and negative low voltages from the DC to DC inverter 57 to turn the thyristor 59 on or off. A snubber circuit 58 limits the switching time of the thyristor 59 so that it can operate reliably.

The modulated high voltage output waveform is then feed to the anode 60 and cathode 55. The anode 60 and cathode 55 are conductive rods, cables, or other shapes that deliver the electric current to the water.

The opto-isolator 61 and the driver transistor 73 allow a microprocessor 68 to control the driver circuit. Thus, the microprocessor 10 of FIG. 1 acts as a signal controller when it directs the electric output switch 20 to turn the high voltage circuit on or off and produce the desired high voltage output waveforms. In the preferred embodiment, the microprocessor 10 can vary the pulse widths, frequencies, and voltage amplitudes of the high voltage output waveforms.

The microprocessor 10 is a device that contains a central processing unit 15, programmable hardware timers 11, support memory including RAM 13 and ROM 14, a clock oscillator 12 that provides the cycle timings for the central processing unit 15 and reference signal for the hardware timers 11, and a variety of digital input and output ports 16.

In FIGS. 5A and 5B the microprocessor is implemented with a micro-controller 68 that is powered by a 5 volt regulator IC 65. This implementation uses a DS5000 microcontroller from Dallas Semiconductor 68, which is similar to the 8051 family of micro-controllers from Intel Corp. However, many other microcontrollers and microprocessors can be used.

The memory built into the microcontroller 68 holds the programming instructions that run the unit. The microcontroller can be programmed by setting the program switch 71 and inputting the new code through the serial driver 70 and serial I/O port. The crystal 72, together with driver circuits in the microcontroller 68, provide the clock pulses needed for the system to work. The software instructions that generate the output waveforms normally make use of programmable hardware timers 11 shown in FIG. 1. The hardware timers can be set to generate interrupts when they time out, so that the timing accuracy can be maintained while the microprocessor 10 is handling other control or monitoring functions. If the microprocessor 10 has no built in timers, external programmable timers can be used. If no other control functions are allowed, then software timing loops can be employed. The clock oscillator 12 that drives the microprocessor 10 should have an output frequency high enough to allow the switching of the output at the highest desired rate.

Figure 4:
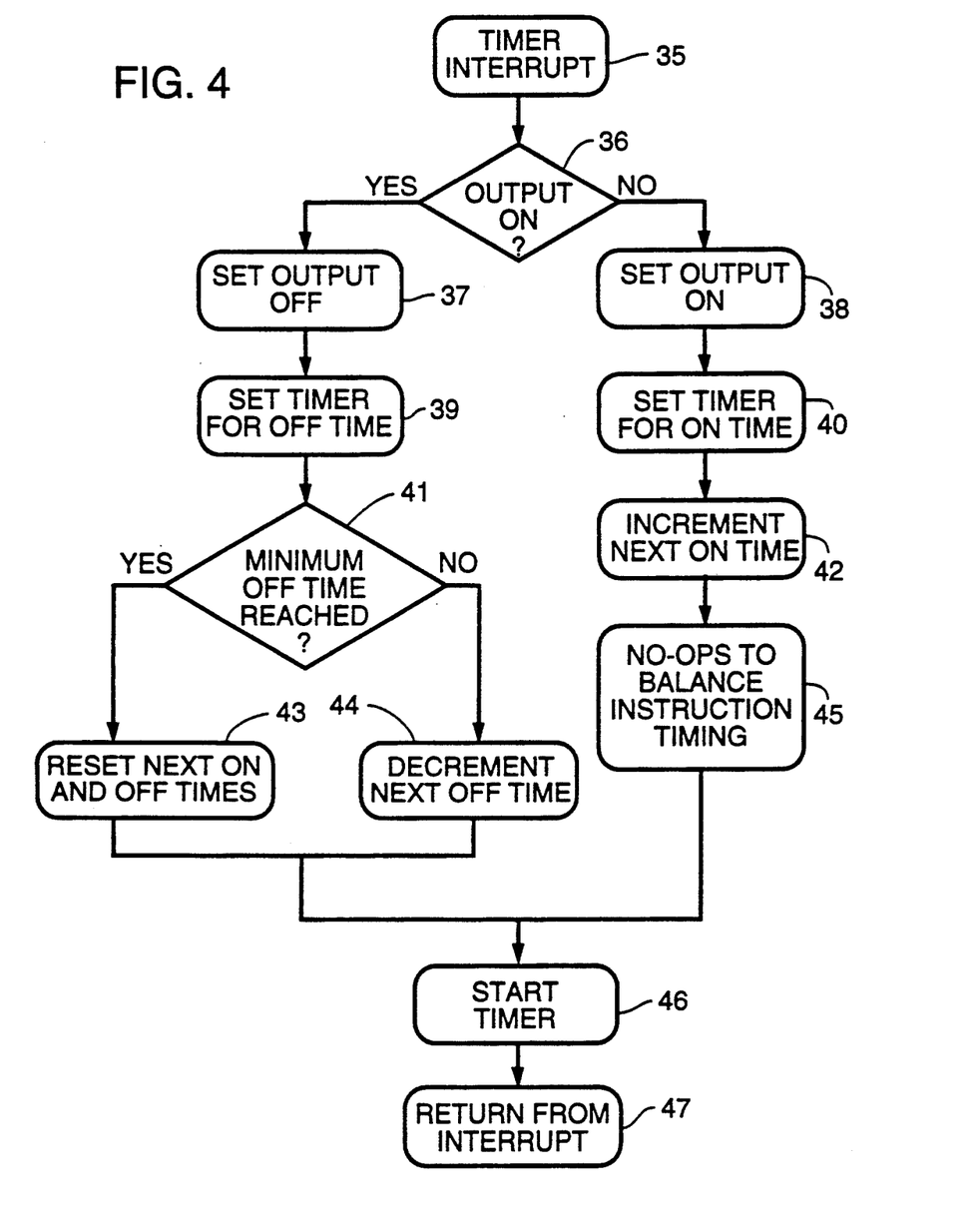
FIG. 4 is a flow chart of a computer program for generating the waveforms depicted in FIG. 2 and FIG. 3.

A software flowchart is shown in FIG. 4. The software utilizes the hardware timer interrupt that is invoked when the timer has timed out. Therefore, this flowchart describes the interrupt service routine for the timer. When the timer interrupt 35 occurs, a test is done 36 to find the current state of the output waveform. If the output waveform is On, it is turned Off 37 and the timer is set for the current Off time 39. Once the timer is set to the Off time, a test is done 41 to see if the minimum Off time has been reached. If true, the next On and Off times are reset to their starting values, otherwise the current Off time is decremented by a predetermined amount.

If the output test 36 returns a false value, the output is turned On 38 and the timer is set to the current On time 40. Once set, the current On time is incremented 42 by the same amount that the Off time was decremented 44. Non-operation (No-Op) instructions are then executed 45 to balance the instruction timings between the two branches of the output test 36. In either case, the timer is then started 46 and a return from interrupt is executed 47. By using this interrupt driven technique, the microprocessor is free to do other things, such as monitoring the external input block 30 of FIG. 1, while waiting for the timer to generate the next interrupt.

The external input block 30 allows an operator to select particular output parameters for the unit. This can be as simple as a panel with buttons, knobs, and switches, or as complex as a network connection to other computers. FIGS. 5A and 5B illustrate how an external input block can be implemented. In FIGS. 5A and 5B, the microcontroller 68 reads current state information from a set of control switches 67. In addition, the microcontroller 68 receives information from its serial input and output ports, for communicating with other units.

The preferred embodiment of FIG. 1 also includes the environment sensors 26. The environmental sensors 26 are devices that provide feedback to the microprocessor 10 so that outputs can be automatically adjusted to give optimal results for the given conditions.

With this electric shocking device, a wide variety of pulse derived waveforms can be generated. By selecting fixed on and off periods, standard square wave pulses can be produced with rates and widths ranging from many seconds to the maximum switch operating speed. By increasing or decreasing the pulse width as each pulse is produced, the power applied to the water can be varied in a way that can simulate the effects of non-pulsed waveforms, such as the linear ramp shown in FIG. 2 and FIG. 3.

Figure 2:
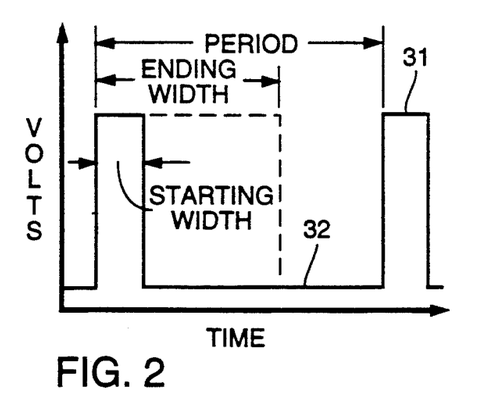
FIG. 2 is a plot of a variable width pulse waveform.

FIG. 2 depicts a series of pulses that increase in width over time, going from a narrow starting value to a wider ending value. If the output waveform on-time 31 is increased and the off-time 32 decreased by the same amount with each new pulse, the period of the pulses (or pulse frequency) can be held constant while the average power of the output is increased.

Figure 3:
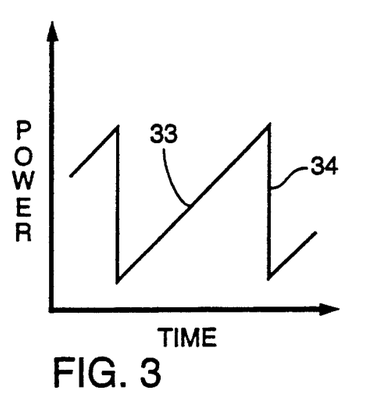
FIG. 3 is a plot depicting the increase in average power over time for a waveform that increases with each successive pulse width.

FIG. 3 depicts the increase in average power over time for a waveform that increases each successive pulse width. When the ending pulse width is reached, the values for the on-time 31 and off-time 32 are reset to their starting values 34 and the cycle starts over. Such a pulse waveform, with the right timing parameters and voltage levels, can be used in an electric fish barrier to progressively induce the fish not to cross, and thus reduce the stressful impact the fish experiences in comparison to a non-varying pulse.

The illustrated electric fish shocking device can also produce gated bursts that simulate pulses with much wider widths but use less overall power and reduce stress on the fish. The software instructions count the number of pulses generated and then wait a period of time after a given number is reached. Thus, this device has the ability to change the way the pulses are produced without using different hardware.

Other modifications include using a single microprocessor to control several fast electric output switches, each with their own power supply, as might be needed in fish barriers and fish guidance systems.

Figure 6:
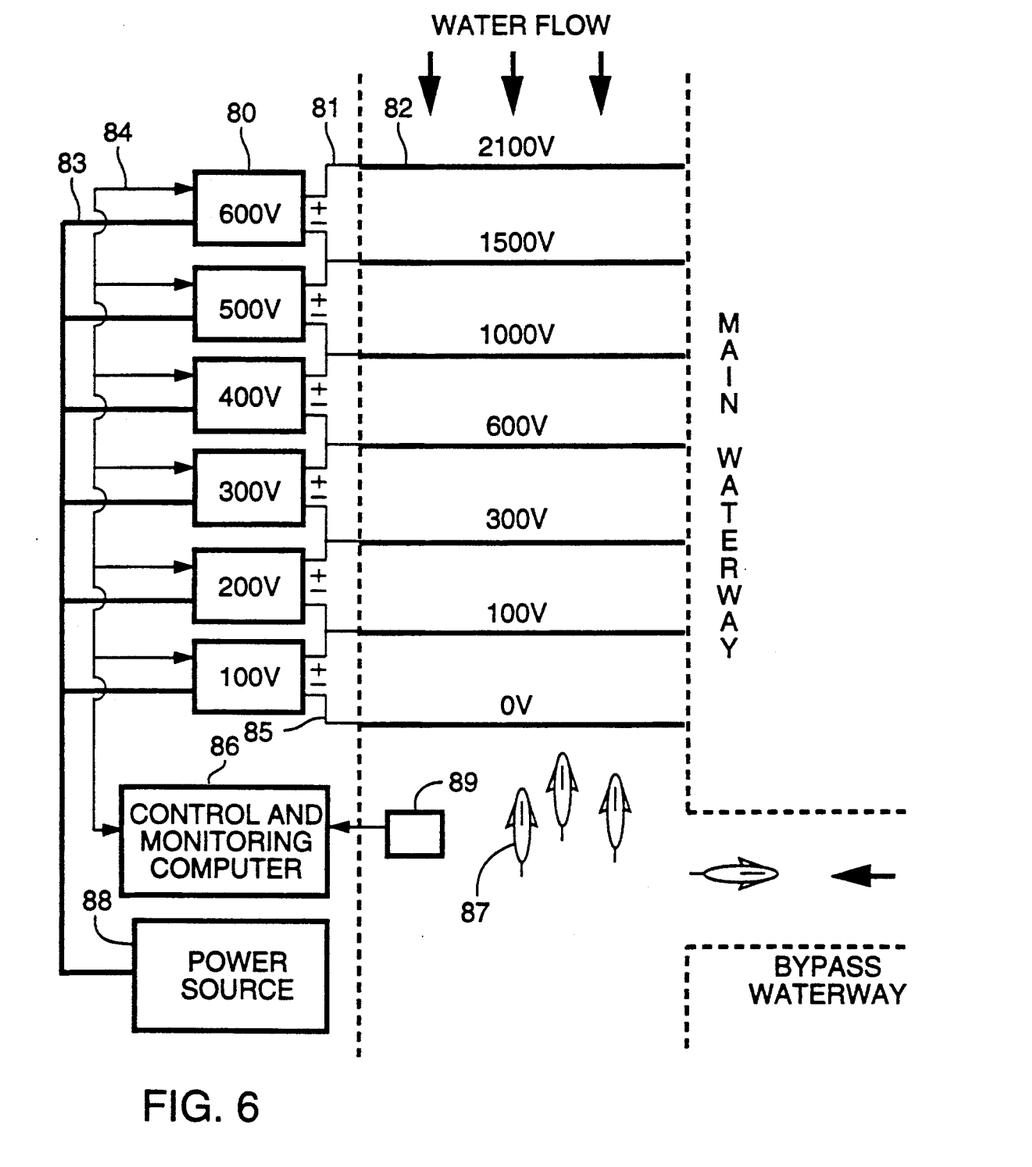
FIG. 6 depicts the application of this invention in an electric fish barrier.

Alternately, one could employ a single microprocessor for each switch and power supply, and synchronize the output pulses of the individual units as shown in FIG. 6. FIG. 6 is similar in structure to U.S. Pat. No. 4,750,451. Six of the fish shocking devices described in FIG. 1 and shown in FIG. 6, at 80 have their outputs connected by cables 81 and 85 to an array of electrodes 82 which are laid in the water across a stream or other waterway.

The outputs are configured to produce an increasing field gradient along the length of the electrode array 82. This voltage field first discourages and then stuns any fish 87 that attempt to cross the barrier. Stunned fish are swept back downstream by the water flow. A separate computer 86 monitors the system via a local data network 84, the local environment through sensors 89, and provides control information needed to optimize the outputs for given conditions.

The data network 84 also carries signals that keep the units in synchronous operation. Power for each of the units 80 is supplied by cables 83 from the power source 88, which can be the normal AC power source or a local backup generator. Since the computers in each unit can communicate with each other, as well as with the separate monitoring computer, they can be programmed to automatically compensate for a failure of one of the units by adjusting the remaining output voltages or waveforms.

Figure 7:
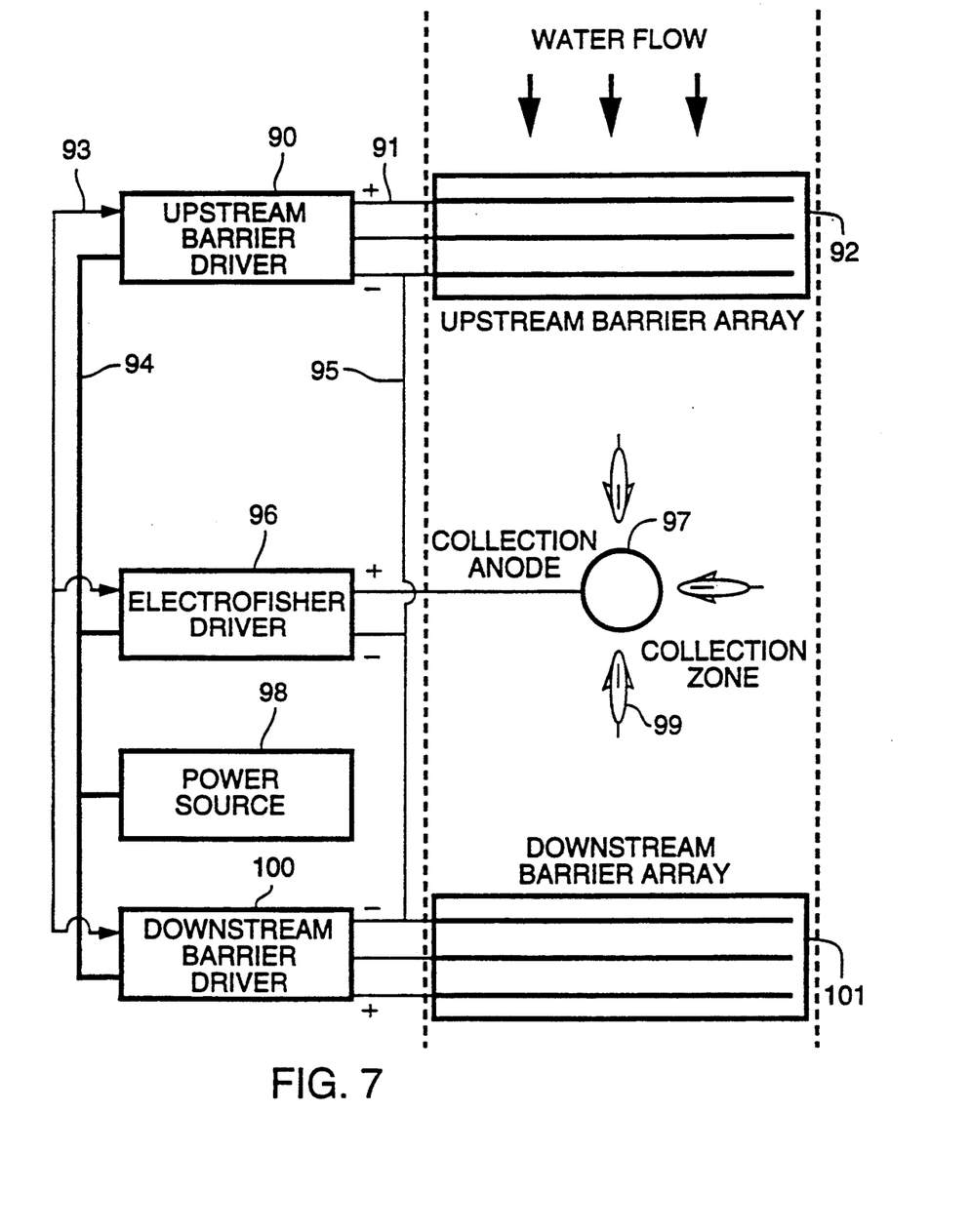
FIG. 7 depicts the application of this invention in an electric fish collector that includes an electrofisher and two electric fish barriers.

In addition, the fish barriers can be combined with an electrofisher to form a system that provides upstream and downstream barriers to pen-in a section of a stream. Fishing electrodes can then gather the fish, as is shown in FIG. 7. Such a system is possible with this technology, since the outputs of all the electrodes in the system can be synchronized and waveforms individually selected for each electrode to provide optimum results.

In FIG. 7 a section of a stream is isolated by electric fish barriers 92 and 101 so that a sample of the stream's fish population can be taken. The electrode arrays for the barriers consist of flexible metal cables attached to a non-conductive support, such as a rubber mat. These electrode arrays are then connected to their respective driver units 90 and 100 by cables 91.

The upstream electric fish barrier 90 is set to generate electric current that is just strong enough to deter fish 99 from crossing its barrier array 92. The upstream electric fish barrier reduces the fishes' ability to swim and allows the water flow to safely sweep the fish back downstream into the collection zone between the barriers.

The Downstream Barrier Driver 100 is set to produce short bursts of electric current designed to startle but not stun any fish attempting to cross it's barrier array 101. When the flow of water is of a sufficient velocity, the fish will be facing upstream to minimize their swimming effort while trying to stay in one place to avoid the notice of predators. When fish are startled, their instinctive response is to swim forward very quickly, so this will cause the fish to swim back into the collection zone.

The edges of the barrier arrays that face the collection zone are desirably tied together by a cable 95 and the polarities of the barriers are set such that the electric potential between the two barrier arrays is equal and no current will flow. This common connection between the two barriers 95 is then tied to the cathode output of the electrofishing driver unit 96. The anode output is connected to a metal ring or other shape that will form the collection Anode 97. The anode 97 is mounted on an insulated pole and moved through the water of the collection zone.

The electrofishing driver 96 is set to output an electric current that will induce Galvanotaxis and attract the fish 99 to the anode 97, where they can be easily netted. The driver units 90, 96, and 100 are connected to each other by a data network cable 93 so that information can be exchanged for control and synchronization purposes. They are also connected to a common power source 98 by cables 94. The power source would normally be a portable generator, although any sufficient source of power can be used.

In view of the wide range of embodiments to which the principles of the present invention can be applied, it should be understood that the methods and apparatus described should be considered as illustrative only and not as limiting the scope of the invention. Instead, the invention includes all such embodiments as may come within the scope and spirit of the following claims and equivalents thereto.

We claim:

1. An electric fish shocking device comprising:
   a power input for receiving a voltage signal;
   voltage-selection means coupled to the power input for providing a variable voltage output signal, the voltage selection means including a high frequency inverter for converting the voltage signal received from the power input to a higher frequency, and means for rectifying the higher frequency signal, said means including means for increasing the voltage from the power input;
   modulation means coupled to the voltage-selection means for modulating the variable voltage output signal to produce an output signal waveform;
   controller means coupled to the voltage selection means and to the modulation means for controlling parameters of the output signal waveform, said controller means further including a memory for electronically storing waveform modulation instructions; and
   signal-delivery means coupled to the output of said modulation means for delivering the output signal waveform to a body of water.

2. The electric fish shocking device of claim 1 in which the controller means includes means for controlling a plurality of waveform parameters including pulse width, pulse amplitude, and pulse repetition rate in arbitrary fashion in accordance with data stored in the memory.

3. The electric fish shocking device of claim 1 in which the controller means includes means for receiving a sensor signal to indicate changing conditions, and means for controlling said output signal waveform in response thereto.

4. An electric fish barrier comprising a plurality of fish shocking devices in accordance with claim 1, and which further comprises:
   synchronizing means for synchronizing the output signal waveforms provided by the plurality of fish shocking devices in a desired manner; and
   a plurality of electrodes spaced and arranged in an aqueous region, each of said electrodes being coupled to a corresponding one of said fish shocking devices.

5. The electric fish barrier of claim 4 in which the plurality of electrodes produce an increasing electric field gradient through said aqueous region.

6. The electric fish barrier of claim 4 in which each of the controller means includes means for selecting a plurality of waveform parameters.

7. The electric fish barrier of claim 4 in which each of the controller means includes means for receiving a sensor signal to indicate changing conditions, and means for controlling the corresponding output signal waveform in response thereto.

8. The electric fish barrier of claim 4 in which each of said voltage-selector means includes means for supplying a plurality of voltage output levels, and in which said controller means includes means for selecting among the plurality of levels to produce voltage variant waveforms.

9. A method of confining fish in a confinement zone in a flowing waterway comprising:
   providing upstream and downstream electrode barriers defining a confinement zone therebetween;
   driving the upstream electrode barrier with a first electrical signal;
   driving the downstream electrode barrier with a second electrical signal;
   each of said first and second signals being characterized by voltage, duration, and repetition rate parameters;
   wherein the first and second signals differ in at least their duration or repetition rate parameters.

10. The method of claim 9 in which the first and second signals are pulsed signals.

11. The method of claim 9 which further includes:
   selecting parameters of the first signal so that the upstream electrode barrier reduces nearby fishes' ability to swim and allows the waterway flow to safely sweep the fish back downstream into the confinement zone; and
   selecting parameters of the second signal so that the downstream electrode barrier startles, but does not stun, nearby fish, causing them to swim from the downstream electrode back into the confinement zone.

12. The method of claim 9 which further includes driving the upstream and downstream electrode barriers with signals of the same electric potential, so that no current flows therebetween.

13. The method of claim 9 which further includes providing a collection electrode in the confinement zone and driving said collection electrode with a third signal that tends to attract, rather than repel, fish.

14. The method of claim 13 which includes establishing a common connection between power sources driving the upstream electrode barrier, the downstream electrode barrier, and the collection electrode; and wherein:
   the first and second signals have one polarity relative to said common connection; and
   the third signal has the same polarity as the first and second signals relative to said common connection.

15. A method of stimulating fish with an electrical signal, the electrical signal being characterized by first and second parameters, one of said parameters being pulse width, another of said parameters being pulse repetition rate, the method comprising: applying to a submerged electrode a series of pulses, and changing the first parameter over time, wherein a non-rectangular stimulation waveform is simulated.

16. The method of claim 15 which further includes maintaining the second parameter constant while changing the first.

17. The method of claim 15 in which the first parameter is pulse width.

18. The method of claim 17 which includes changing the width of each successive pulse in the series.

19. The method of claim 17 which includes starting each series with a pulse of a first width, and ending each series with a pulse of a second width, and then repeating the series.

20. The method of claim 17 which includes changing the width of each successive pulse by a constant amount, wherein a stimulation waveform simulating a linear ramp is achieved.

* * * * *